Figure 1:
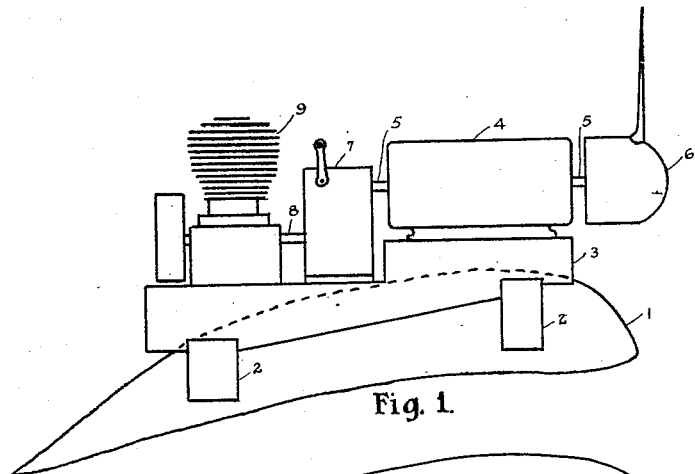

May 3, 1932.  S. L. LA HACHE ET AL  1,856,568

RADIO POWER INSTALLATION

Filed Feb. 11, 1928  3 Sheets-Sheet 1

INVENTORS

BY *Harold Dodd*
ATTORNEY

May 3, 1932.  S. L. LA HACHE ET AL  1,856,568
RADIO POWER INSTALLATION
Filed Feb. 11, 1928   3 Sheets-Sheet 2

Inventors:
S. L. La Hache
F. B. Monar.

Patented May 3, 1932

1,856,568

UNITED STATES PATENT OFFICE

SAM L. LA HACHE AND FRED B. MONAR, OF WASHINGTON, DISTRICT OF COLUMBIA

RADIO POWER INSTALLATION

Application filed February 11, 1928. Serial No. 253,777.

Our invention relates broadly to a device for the continuous supply of power to radio devices upon airplanes and more particularly to a radio assembly in which efficient operation of the radio sets may be accomplished whether the plane is in the air or in a stationary position upon land or water.

The object of the invention is the production of a radio power installation of such a character that as the plane is landing the force which is exerted upon the propeller of the air driven generator is utilized to start a prime mover independent of the main motors of the airplane and such an arrangement of the parts that when the plane is at rest the air generator will be driven by the prime mover at a speed similar to that at which it ordinarily runs while the plane is in the air.

Another object of our invention is to incorporate in such an installation a device by which the speed of the generator is maintained constant irrespective of the load placed thereon by the transmission of signals whether such signals are activated by a key or telephone.

Further objects of our invention will appear more fully hereinafter as the description of the method and apparatus is developed.

Our invention consists substantially in the construction, combination and arrangement of parts associated therewith or as will be more fully hereinafter set forth as shown by the accompanying drawings and finally pointed out in the appended claims.

Figure 2:
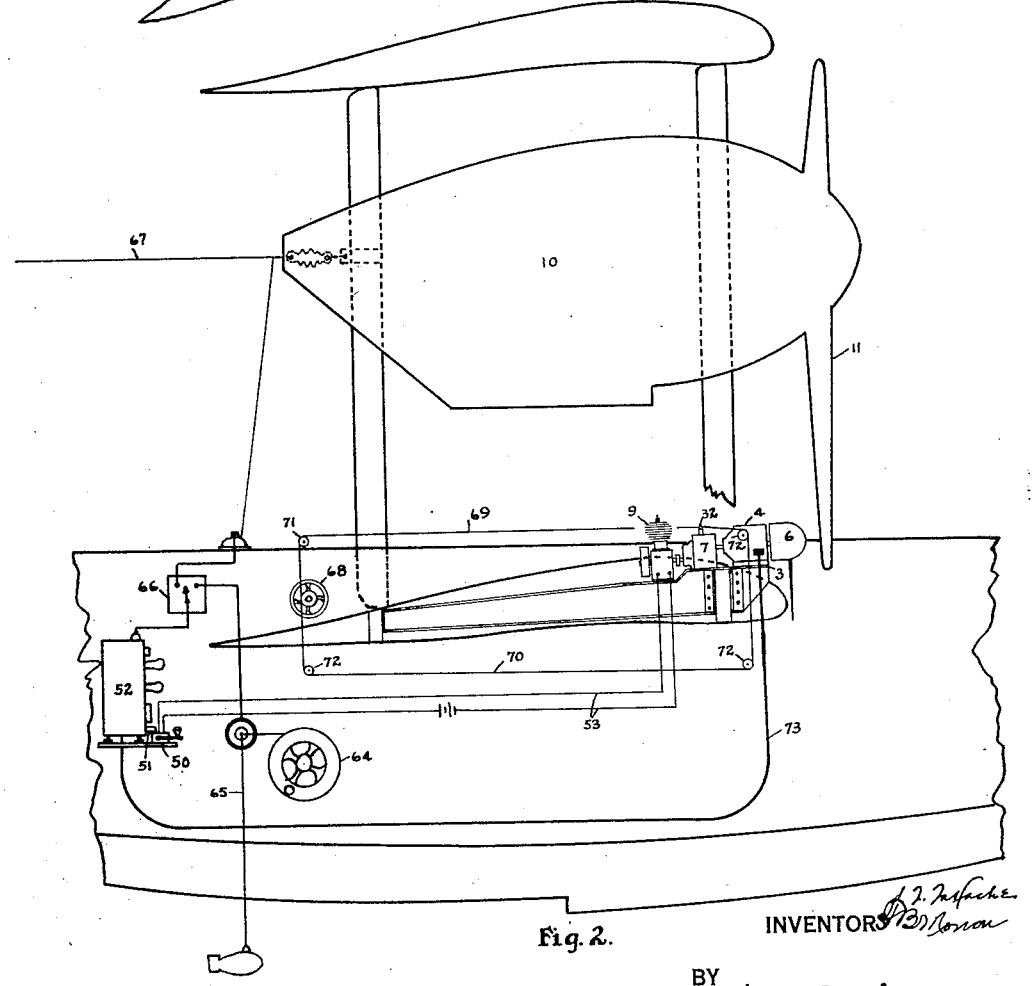
Figure 3:
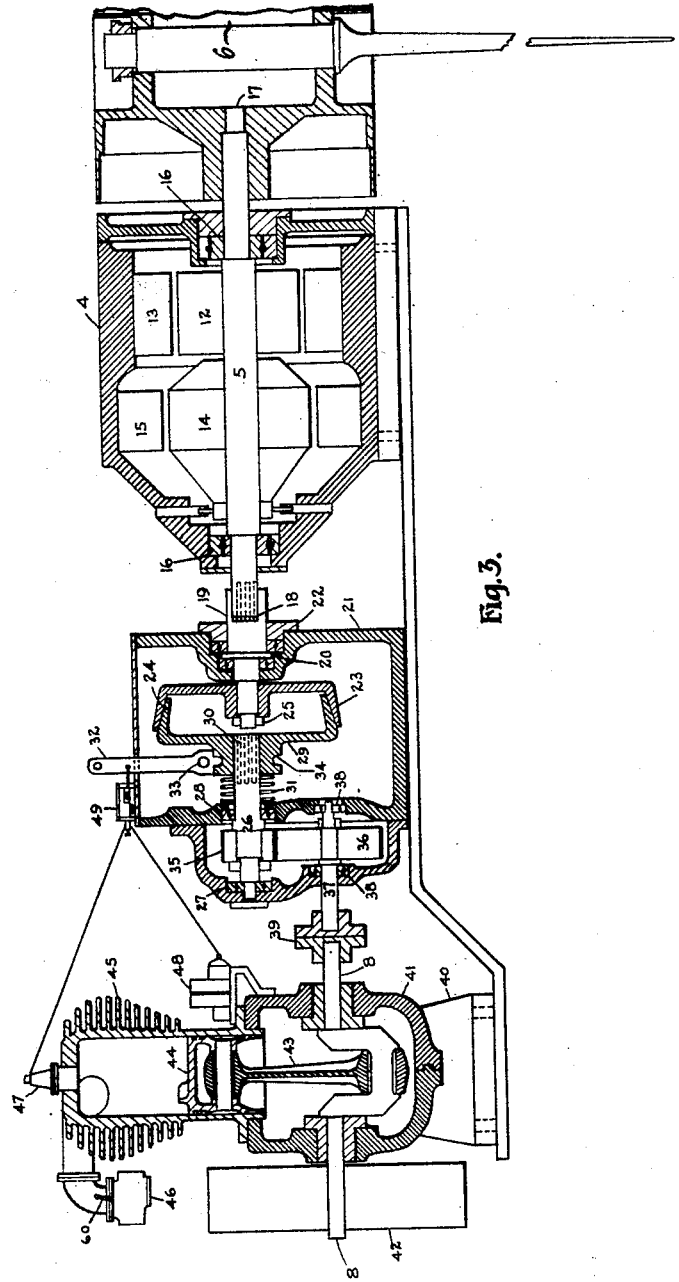
Figure 4:
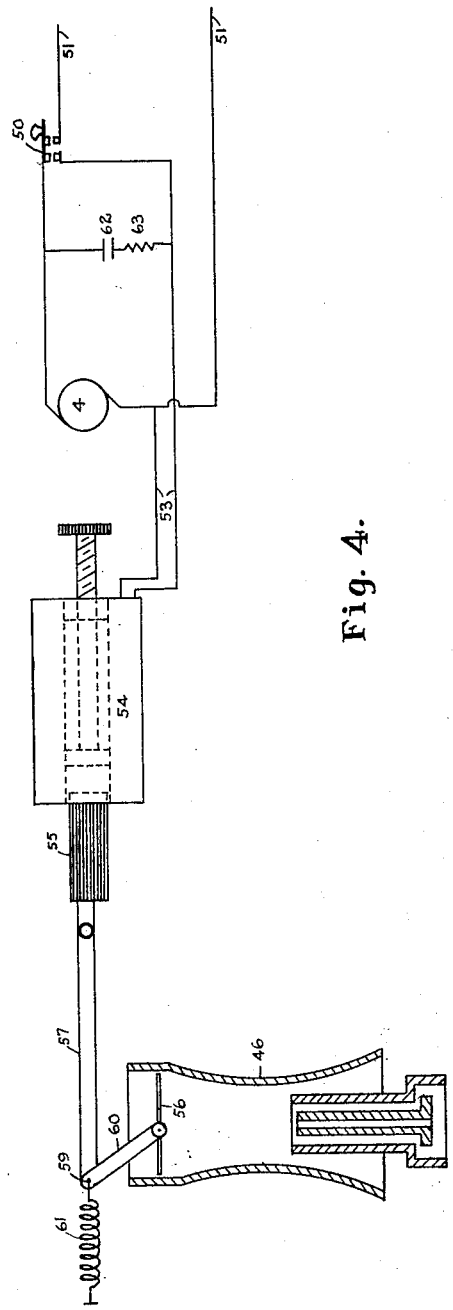

Reference is to be had to the accompanying drawings forming a part of this specification in which like reference characters indicate corresponding parts througout the several views and in which:

Figure 1 is a diagrammatic view of the air generator and prime mover as mounted upon the airplane wing, Figure 2 is a diagrammatic view of the power installation shown in Figure 1 as located with respect to the radio instruments of the airplane, Figure 3 is a cross sectional view longitudinally through the power installation shown in Figure 1, and Figure 4 is a diagrammatic view of the electrical system and controls for the carburetor to maintain the speed of the generator constant irrespective of the electrical output of the raido system.

Referring particularly to Figure 1, numeral 1 designates the wing of an airplane with supporting members 2 of ordinary construction in the internal structure of the wing 1. Upon these supporting members 2 rests a base member 3 of such a shape that when the power installation is placed thereon the propeller of the air driven generator clears the surface of the wing 1. Upon the forward portion of the base member 3 is located the body of an air driven generator 4 one end of the shaft 5 of which carries the usual air driven propeller 6, the other end of the shaft 5 engages the transmission mechanism 7 which in turn engages the shaft 8 of a prime mover 9.

Referring to Figure 2 numerals 3, 4, 7 and 9 designate the base, air driven generator, transmission mechanism and prime mover described with reference to Figure 1. As shown we prefer to locate this installation upon the lower wing below the airplane engine 10 and directly in the path of the air flowing from the tip of the airplane propeller 11. This is preferable when such a device as ours is to be used upon a biplane. However, it is to be understood that any positioning of the unit in such a place that it receives a direct flow of air upon the propeller 6 of the air driven generator is within the scope of our invention. Similarly when our invention is applied to monoplanes the general construction of which is varied at the present time, any location of the unit where it will receive the maximum efficiency of operation is within the scope of our invention.

It is to be understood that although in the following description reference will be made to the airplane as a biplane, the use of our devices upon any type of aircraft is within the scope of our invention.

Referring particularly to Figure 3 the casing of the generator 4 is mounted upon the forward end of the base 3. The shaft 5 of the generator carries the rotor 12 of the inductor type alternator 13. The shaft 5 also carries the armature 14 of the exciter generator 15 and is mounted in ball bearing races 16 which are mounted in the casing of the generator 4. The end 17 of the shaft 5 carries the usual type of air driven propeller 6 now in use on most types of airplanes.

The end 18 of the shaft 5 is splined to rigidly receive the end of the shaft 19 of the transmission mechanism 7. The shaft 19 is mounted in thrust bearings 20 which are mounted within the casing 21 of the transmission mechanism 7. These bearings 20 are provided with adjustment elements 22 which are threaded into the casing 21.

Upon the shaft 19 and within the casing 21 there is the female member 23 of a cone clutch 24, the member being keyed to the shaft 19 and secured thereon by means of a nut 25.

In axial alignment with the shaft 19 is a second shaft 26 that is mounted in adjustable bearings 27 and 28 in the casing 21. Upon one end of the shaft 26 is mounted the male member 29 of the cone clutch 24. This member 29 is slidable longitudinally upon the splines 30 of the shaft 26. The two members of the conical clutch 24 are held together by means of pressure spring 31. The disengagement of the clutch members is accomplished through the operation of a lever 32 which is pivoted at a point 33 and the lower end of which engages the collar 34 of the member 29 as is customary in the usual control of clutches of this type.

Upon the other end of the shaft 26 and intermediate the bearings 27 and 28 there is a gear 35 keyed thereto. This gear engages a gear 36 which is mounted upon a shaft 37 which in turn is mounted in bearings 38 in the casing 21 of the transmission mechanism 7.

Upon the rear end of the base 3 is mounted the prime mover 9, in this case a gasoline or alcohol engine of light construction, the shaft 8 of which is in axial alignment with the shaft 37 and coupled thereto by means of a universal joint 39.

The prime mover consists of a multi or single cylinder engine, the base 40 of which is mounted upon the base member 3. This prime mover consists of a crank-case 41, the usual crank-shaft 8, fly wheel 42, connecting rods 43, piston or pistons 44, and cylinder or cylinders 45.

The fuel is supplied to the combustion spaces within the cylinders from a carburetor 46, the control of which is to be hereinafter described with reference to Figure 4.

The ignition current is supplied to the spark-plug or plugs 47 from a magneto 48, the high tension leads of which pass through switch 49 that is mounted upon the top of the casing 21 of the transmission mechanism 7 and opened or closed by means of the lever 32 to stop the prime mover when the clutch 24 is disengaged or to make electrical circuit from the magneto to the spark plugs when the clutch 24 is in engagement.

The ratio between the gears 35 and 36 is such that the force of the air tending to rotate the propeller 6 is sufficient to start the prime mover 9 just before landing and such that the speed of the prime mover will maintain the generator 4 at its normal operating speed when being rotated by the prime mover alone.

We have found that when the gear ratio is so proportioned that this can be accomplished the load placed upon the generator by the closing of the transmitting key 50 or the operation of a telephone substituted therefor appreciably slows up the speed of the generator 4. To compensate for this decrease in speed we have developed the circuit shown in Figure 4 to control the power generated by the prime mover 9.

Referring particularly to Figures 2 and 4 numeral 50 designates the radio transmitting key, the leads 51 of which are connected to the radio transmitter 52. To the key 50 are also connected two leads 53 that are connected from the generator 4 to a solenoid 54. Within the solenoid 54 is an armature 55 that is mechanically connected to the butterfly valve 56 of the carburetor 46 of the prime mover 9. The mechanical connection is made by means of a lever pivoted at one end 58 to the armature 55 and at the other end 59 to the lever which is rigidly connected to the butterfly valve 56. We have provided herein a construction similar to that employed in the accelerator construction at present in use in automobiles and to that end have provided an adjustable spring 61, the tension of which maintains the butterfly valve 56 in the position normal to the unloaded operation of the prime mover and generator.

The key 50 is shunted by the usual condenser 62 and resistance 63. The resistance and condenser are so placed that they serve to eliminate any arcing of the key from the counter-electromotive force from the solenoid 54 when the key is opened.

Referring again to Figure 2, the transmitter 52 and the key 50 are located in the cockpit within easy reach of the operator. Also within easy reach of the operator is the antenna reel 64 for the trailing antenna 65 and the antenna switch 66 for shifting the connections of the transmitter from the trailing antenna 65 to the skid-fin antenna 67. The connections from the generator 4 to the transmitter 52 are shown by the cable 73. It is to be understood that any type of antenna may be used in place of the skid fin antenna and the trailing antenna but for the most practicable service we have found that these two types of antennæ are most efficient when all kinds of weather conditions are taken into account.

Also within easy reach of the operator is the clutch operating mechanism one embodiment of which we have found serviceable and consists of a hand wheel 68 over which are wound two cables 69 and 70. The cable 69 passes over a pulley 71 and is connected to the lever 32 of the transmission mechanism 7. The cable 70 passes over three pulleys 72 and is attached to the lever 32 of the transmission mechanism 7 so that by rotation of the wheel 68 in either direction the members of the clutch 24 are engaged or disengaged.

The operation of the entire system is as follows. Assuming the plane is in the air, the generator 4 is being driven by means of the air driven propeller 6, the prime mover 9 being stationary and mechanically disconnected from the generator due to the open clutch 24 and the open circuit in the ignition circuit of the prime mover caused by the position of switch 49 described in Figure 3. The transmitter is being operated at this time upon the trailing antenna 65.

Assume now that a forced landing is necessary, the operator then, while the plane is still in the air, turns wheel 68 so that the members 23 and 29 engage each other by the action of the lever 32 of the transmission mechanism. This movement of the lever 32 also closes the ignition circuit of the prime mover through switch 49. The prime mover 9 is then started under the power in the generator 4 produced by the air driven propeller 6. The generator then is being rotated under the combined power of the air driven propeller and the prime mover 9. Then the operator reels in the trailing antenna 65 and shifts the transmitter to the skid-fin antenna 67 by means of the switch 66. The plane then lands.

The operator now may close the key 50 to transmit signals from the skid-fin antenna. The closing of the key 50 simultaneously produces more power in the prime mover 9 by the devices described with reference to Figure 4 for maintaining a constant power output of the generator 4.

It will be understood that the above description and accompanying drawings comprehend only the general and preferred embodiment of our invention and that minor detail changes in the construction and arrangement of parts may be made within the scope of the appended claims without sacrificing any of the advantages of our invention.

What we claim is as follows:

1. In combination, an aircraft, a radio installation having a transmitter, a controller for the transmitter, means for generating power for said installation comprising a generator, a prime mover for driving said generator, a carburetor on said prime mover, and means actuated by said controller for automatically regulating the carburetor of said prime mover to maintain the speed of said generator substantially constant irrespective of the electrical load placed on the generator.

2. In combination an aircraft, a radio installation having a transmitter, a controller for the transmitter, means for generating power for said installation, said means consisting of a generator, a prime mover independent of the prime mover of the aircraft, a craburetor on said prime mover, means for driving said generator by said prime mover, and means actuated by said controller for automatically regulating the carburetor of said prime mover to maintain the speed of said generator substantially constant irrespective of the electrical load placed thereon by said controller, said regulating means comprising a solenoid connected with said controller, an armature in said solenoid and mechanical means connecting said armature with the carburetor control of said prime mover.

3. In combination with an aircraft, a radio power installation system comprising a transmitter control, a generator, an engine independent of the engine for said aircraft for driving said generator, a carburetor on said engine and means actuated by said control to automatically regulate the carburetor of said engine to maintain the speed of said generator substantially constant independent of the electrical load on said generator, said carburetor regulating means consisting of a solenoid, an armature therefor and mechanical means connecting said armature and transmitter control with the carburetor of the engine.

4. In combination an aircraft, a radio installation having a transmitter, a controller for the transmitter, means for generating power for said installation comprising a generator, an engine for driving said generator, a carburetor on said engine, and means actuated by said controller for automatically regulating the carburetor so as to maintain the speed of said generator constant irrespective of the electrical load placed on said generator, said carburetor regulating means consisting of a solenoid connected with said controller, a solenoid armature, and mechanical means connecting said armature with the carburetor of the engine.

SAM L. LA HACHE.
FRED B. MONAR.